Dec. 5, 1950     E. J. DILLMAN     2,532,896
TEMPERATURE OPERATED VALVE
Filed Dec. 6, 1944
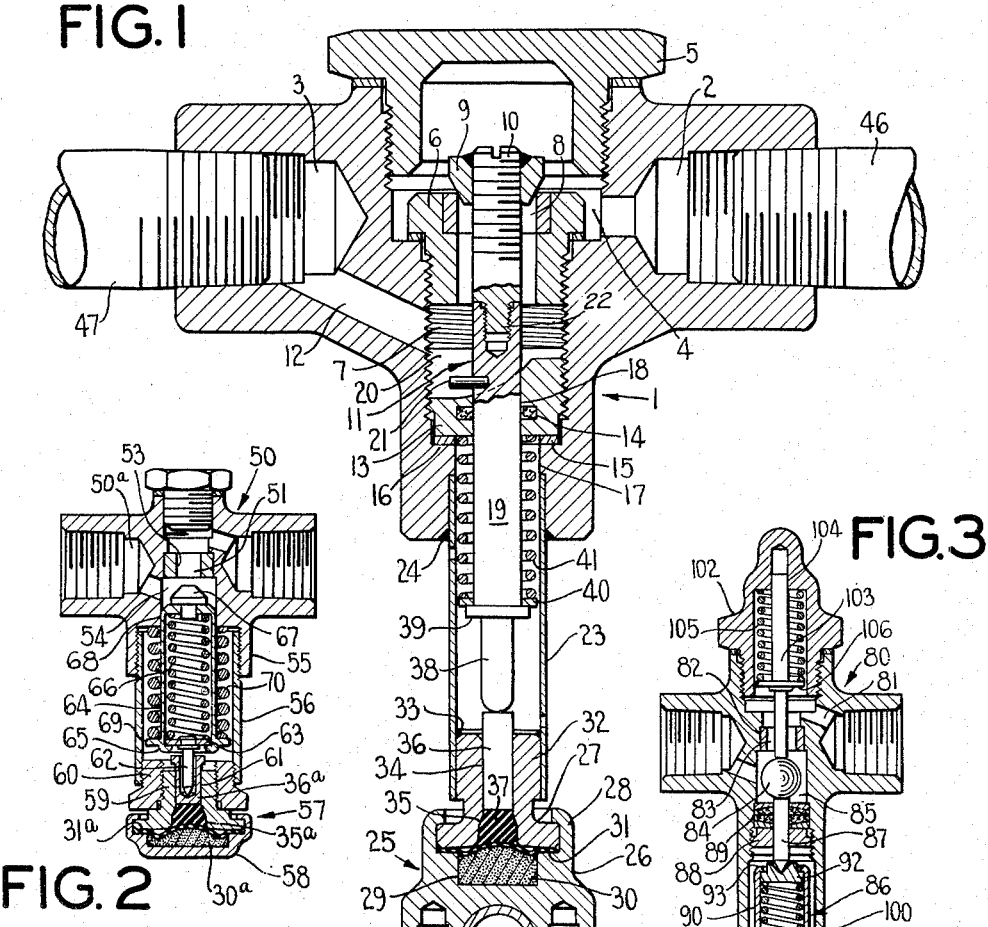
INVENTOR.
Earnest J. Dillman
BY
Andrew K. Foulds
ATTORNEY Patented Dec. 5, 1950

2,532,896

UNITED STATES PATENT OFFICE 2,532,896

TEMPERATURE OPERATED VALVE

Earnest J. Dillman, Detroit, Mich., assignor to Detroit Lubricator Company, Detroit, Mich., a corporation of Michigan Application December 6, 1944, Serial No. 566,803

6 Claims. (Cl. 236—99)

This invention relates to new and useful improvements in temperature responsive or operated device and more particularly to a thermostatic valve.

An object of the invention is to provide a valve of simple and rugged construction which is particularly adapted for quantity production.

Another object is to provide a valve which will be positive in action and which will respond accurately at a desired temperature or temperatures.

Another object is to provide a valve which is capable of easy disassembly for cleaning or the like.

The invention consists in the improved thermostatic valve construction to be more fully described hereinafter and the novelty of which will be particularly pointed out and distinctly claimed.

In the accompanying drawing to be taken as part of this specification, there is fully and clearly illustrated several preferred embodiments of this invention in which drawing:

Figure 1 is a view in longitudinal central section of a thermostatic valve embodying the invention and showing portions of the conduits with which it cooperates, Fig. 2 is a longitudinal section of another form of thermostatic valve in which the valve member is closed upon temperature increase, Fig. 3 is a view in longitudinal center section of another form of thermostatic valve in which the valve member is shut upon temperature increase, Fig. 4 is a view in longitudinal central section of still another form of thermostatic valve, showing the same in heat exchange relation which a member whose temperature controls the valve, and Fig. 5 is a detail view in section on line 5—5 of Fig. 4.

Referring to the drawing by characters of reference and particularly Fig. 1, the numeral 1 designates generally a valve casing having a passageway therethrough with an inlet 2 and an outlet 3, the inlet and outlet being in alignment with each other. The casing 1 has a central bore transverse to the inlet and outlet and intersecting the center line thereof. The bore is of enlarged diameter at its upper or outer portion, as at 4, to provide a valve chamber which is closed and sealed by a cap member 5. The inlet 2 opens directly into the chamber 4 which contains a valve seat member 6 screw-threaded into the outlet portion 7 of the casing bore. The seat member 6 provides an outlet port 8 controlled by a valve member 9 preferably a nut-like member with a conical valve face and screw-threaded on the end portion or section 10 of a two-part valve stem 11. The outlet 3 communicates with the chamber 7 through a passageway 12, the chamber 7 being closed and sealed by a plug member 13, screw-threaded into the bottom or lower end of the chamber 7. The plug member 13 contains a sealing washer or member 14 of any suitable packing material and serves to compress a washer 15 against an internal annular flange or shoulder 16 formed between the bore of chamber 7 and the further reduced portion 17 of the casing bore. The plug member 13 has a guideway 18 therethrough which receives and guides the lower portion or section 19 of the valve stem 11, the clearance space around the stem being sealed by the packing member 14. The member 13 has a radial guide slot 20 into which extends a pin 21 projecting radially from the valve stem section 19. This pin 21 holds the stem section 19 against rotation so that the upper section 10 which is screw threaded thereinto, as at 22, can be removed or unscrewed therefrom to remove the valve member 9 from the casing 1 upon removal of the cap member 5.

The bore portion 17 is counterbored or slightly enlarged to receive a tubular supporting member 23 which is secured and sealed to the casing 1 by solder or the like as at 24. The lower or outer end of the supporting member 23 carries a temperature responsive power element 25 having a two-part body comprising a base or chamber portion or member 26 and a top or cover portion or member 27. The members 26 and 27 are tightly secured and clamped together as by rolling over the base member rim or flange as at 28. The base portion or member 26 contains a cavity or chamber 29 in which is contained a temperature responsive material 30. The cavity 29 is closed and sealed and the material 30 is retained in the cavity 29 by a diaphragm member 31 of rubber-like material, such for example as Ameripol. The cover member 27 has a tubular extension 32 which fits within the outer end portion of the supporting member 23 and is secured rigidly therein as by solder or otherwise hermetically sealed, as at 33. The cover member 27 has a central guide bore 34 opening at its inner end through the cover member toward the valve stem and opening at its other end into a sealing bore 35 within the cover member. The bore 35 opens through the other or chamber end of the cover member to communicate with the space over the diaphragm member 31. In the bore 34 there is a plunger 36 which seats on a sealing plug 37 of resilient pliable elastic material positioned within the sealing bore 35. The plunger 36 is aligned with the stem 11 and is cooperable with the end portion 38 of the stem section 19, the stem 11 serving as an operating rod for actuation of the valve member 9. Surrounding the stem section 19 there is a collar or flange 39 carrying a spring abutment member 40 which substantially fits the bore of the tubular supporting member 23 so as to guide the lower end of the rod or stem 11. Positioned between the member 40 and the end face of the plug member 13 there is a helical coil compression spring 41 which normally urges the valve member to its seat to close the port 8. The power element 25 is more fully described in the copending application of Sergius Vernet 444,178 filed May 23, 1942, now Patent No. 2,368,181 of January 30, 1945, for Sealing Means.

The lower or outer end of the element base member 26 is provided with an open end slot 42 providing a saddle to receive and sit on a pipe or conduit 43 which may be a portion of the outlet conduit leading from the refrigerant condensing unit of a water cooled condenser which has its supply of cooling water controlled by the valve member 9. The thermostatic valve is clamped to the conduit 43 by a clamping plate 44 which is tightly secured to the member 26 by screws 45, such that the clamping member is generally in the form of a clevis.

The operation of this valve of Fig. 1 is described by way of example as controlling cooling water flow to a refrigerant condenser. When the temperature of the outlet conduit 43 exceeds the desired temperature, showing that the refrigerant is not being properly condensed, then the thermostatic material 30 will expand or change state and force the plunger 36 upward or outward into engagement with the lower end portion of the rod 11. Continued force on the plunger 36 will overcome the spring 41 and move the valve member 9 toward open position thereby permitting cooling water from the source of supply connected to the pipe 46 to flow through the inlet 2 into the chamber 4 and thence through the port 8 and the outlet chamber 7 to the passageway 12 and outlet 3 and thence through the supply pipe 47 to the condenser cooling space for the refrigerant medium. As soon as the temperature of the refrigerant medium leaving the condenser through the pipe 43 drops to the desired temperature, the material 30 contracts, so that the spring 41 can move the valve member 9 toward closed position thereby throttling the flow of cooling water to the condenser. If it is desired to remove the valve member for cleaning or the like, this may be readily done by removing the cap member 5 and then unscrewing the section 10 from the section 19 which is held against rotation by the pin 21.

Referring to Fig. 2, the numeral 50 designates the valve casing having a flow passageway 50a therethrough with internally screw-threaded inlet and outlet and having interposed therein a valve port 51 formed by a valve seat member 53 positioned transverse to the center line of the inlet and outlet. Aligned with the seat member 53 there is a valve chamber 54 which opens at its outer end to the exterior of the casing 50. Forming the outer end of the chamber 54, there is an annular clamping flange 55 which is internally screw-threaded to receive the screw-threaded end portion of a tubular supporting member 56. Carried by the lower or outer end of the supporting member 56 there is a temperature responsive power element 57 generally similar to the power element 25 but differing therefrom in that the base member 58 does not have the clamping saddle. Also in this form shown in Fig. 2, the power element cover member extension 59 is externally screw-threaded to screw within a sleeve member 60 which fits within and is screw-threaded into the supporting member 56. It will be apparent that the sleeve member 60 serves as an adaptor for the proper support of the power element on the member 56. The power element plunger 61 has a longitudinal recess to receive the lower end portion 62 of the valve operating rod or stem. The valve stem is of two-part construction, the portion 62 being carried by a disc 63 reciprocal in a cylinder 64 and held against removal therefrom by a bead or flange 65. The disc 63 is held against the flange 65 by a lost-motion spring 66 contained within the cylinder 64 and acting against the inner wall thereof. Cooperable with the seat member 53 and operable to close or control the port 51 there is a valve member 67 of conical type which is carried by the end wall of the cylinder 64. The upper end portion of the cylinder 64 is guided for reciprocation, as at 68, in the outer end portion of the valve chamber 54. The cylinder 64 has a surrounding flange or spring seat 69 which cooperates with the supporting member 56 to guide the lower or outer end portion of the valve stem or operating rod. Surrounding the cylinder 64 and the valve operating rod there is a helical coil spring 70 which is held under compression between the casing 50 and the flange 69 so that it opposes operation of the valve member 67 by the power element 57. The power element 57 as above noted is substantially similar to the power element 25 and therefore like parts in this Fig. 2 are designated by like characters applied to Fig. 1 with the suffix "a."

The operation of the valve of Fig. 2 is as follows: When the temperature affecting the material 30a has increased to the lower end of the desired valve operating temperature range, the material will begin to force the plunger 36a upward against the force of the spring 70 and at the desired temperature will seat the valve 67 to close the port 51. If the material 30a should continue to expand or exert pressure when the valve member 67 has been seated, then the spring 66 will be collapsed thereby permitting lost-motion of the power element without injuring the power element or valve member or its seat. Upon cooling of the material 30a, as by reduction of temperature to which it is subjected, the spring 70 will move the valve member 67 away from its seat 51 and permit flow through the valve passageway and port 51.

Referring to Fig. 3, 80 designates a valve casing having a passageway 81 therethrough with the inlet and outlet ends thereof in alignment. In the passageway 81 there is a valve seat member 82 providing a valve port 83 positioned transverse to the center line of the inlet and outlet ports. Cooperable with the seat member 82 and operable to control flow through the port 83 there is a ball type valve member 84 positioned in a valve chamber 85. The member 84 is positioned laterally by the chamber side walls and seats loosely on a valve stem or operating rod 86 having its upper end portion 87 in the form of a pin guided in a center line aperture through a packing gland or nut 88 screw-threaded into the outer end of the chamber 85 and holding packing means 89 under compression. The rod 86 includes a lost-motion means in the form of a hollow cylinder 90 having an end wall 91 and a reciprocal disc 92 positioned within the cylindrical 90 and held against movement out of the cylinder by an end flange 93. The disc 92 is normally held against the annular flange or shoulder 93 by a helical coil spring 94 positioned within the cylinder 90 and held under compression between the cylinder end wall 91 and the disc 92. The pin 87 has its outer end of tapered construction which seats in a conical recess in the disc 92. The other end portion of the rod 86 terminates in a threaded pin member 95 which is screw-threaded into the plunger 96 of a temperature responsive power element 97 which is substantially like the power element 57 of Fig. 2. The extension 98 of the power element cover member 99 is externally screw-threaded for threading into the end of the tubular supporting member 100, as at 101.

The end wall of the casing 80 is open, in line with the valve port 83, the opening being closed by a hollow cap member 102 which is screw-threaded into the opening. Positioned within the cap member 102 there is a valve operating thrust member or rod 103 which is guided in a cylindrical recess at one end of the cap member, as at 104. The rod 103 extends through the valve port 83 and engages the ball valve member 84. Surrounding the rod 103 within the cap member 102 there is a helical coil spring 105 which seats against the end wall of the cap member and at its other end bears on a flange or collar 106 carried by and surrounding the rod 103 so that the spring 105 urges the valve member 84 toward open position and opposes closing movement of the valve member by the power element 97. The power element 97 being substantially identical with the power element of Fig. 2, the same reference numerals in this Fig. 3 designate similar parts of the power element of Fig. 2. The operation of the valve of Fig. 3 will be apparent from the foregoing description of the valve of Fig. 2.

The valve shown in Figs. 4 and 5 is particularly adapted for controlling the flow of gases such for example as vaporized refrigerant medium. In these Figs. 4 and 5, the numeral 110 designates a T-shaped valve casing having its standard 111 formed by a tubular flange extending downward from its cross member or arms 112 which may be intercalated in a pipe or conduit 113. Within the cross member 112 there is a sleeve 114 forming the valve chamber and providing end faces for abutment by the spaced ends of the conduit 113. Positioned within the sleeve member 114 there is a butterfly or plate type valve member 115 of generally oval outline, see Fig. 5, journaled on a shaft 116 supported at diametrically opposite points in the sleeve member 114. The valve member 115 is limited in opening movement to wide open position by a cross rod 117 fixed at its ends in the sleeve member 114. An operating rod or stem 118 is pivotally connected to the valve member by ears and a pivot pin 119 and extends downward through an aperture or slot 120 in the sleeve 114. The slot 120 registers with the opening of the standard 111 into the cross member 112, so that the rod 118 projects into the interior of the stem flange 111.

A tubular supporting member 121 is secured and sealed at one end, as at 122, within the flange 111. The member 121 is preferably of sheet material and has a bead or internal shoulder 123 rolled or otherwise formed therein to provide an abutment for a spring seat member 124 of annular form and of angle form in cross section. Guided through the member 124 is a hollow cylinder portion 125 of the valve operating stem or rod 118. The cylinder rod portion 125 is threadedly connected for adjustment, as at 126, to the rod portion which is pivotally connected to the valve member 115. In the construction herein shown the adjustment of the valve stem portions 125 and 126 must be accomplished before assembly or after disassembly. However, it should be obvious to the artizan that an access opening could be provided to facilitate adjustment of the assembled valve. Reciprocal in the cylinder portion 125 there is a spring follower disc 126' having an end portion 127 projecting from the cylinder portion 125 and having secured thereto a spring seat or abutment member 128. Within the cylinder portion 125 there is a lost-motion spring 129 of helical coil form which is held under compression between the inner end wall of the cylinder portion 125 and the disc 126' so as to urge the disc outward. An annular rim or shoulder on the cylinder portion 125 limits outward movement of the disc 126' under the force of the spring 129. Surrounding the stem 118 and the cylinder portion 125 there is a helical coil spring 130 seating at its opposite ends and under compression between the seat members 124 and 128, so that the spring 130 urges the valve member toward open position and toward engagement with the stop rod 117. The seat member 128 is preferably of a diameter such that it cooperates with the supporting member 121 to guide the outer or lower end portion of the valve operating rod 118. Secured and sealed in the bottom or outer end of the supporting member 121 there is a temperature responsive power element 131 which is substantially like the power elements above described but differing therefrom in that the cover member 132 which guides the plunger 133 is screw-threaded into the base member 134 instead of being clamped thereto as in the foregoing figures. Also the base member 134 fits within the supporting member 121 as distinguished from the extension on the cover member as in the foregoing figures. The base member 134 has a heat exchange extension or plug 135 which is externally screw-threaded for threading into a container wall 136, as at 137. The container wall 136 may, for example, form the housing of an electric motor (not shown) for driving the compressor of a refrigerating apparatus. Accordingly, whenever the compressor is overloaded so that overload is placed on the motor with resulting heating of the wall 136, the power element 131 will act through its thrust member 133 and the operating rod 118 to move the valve member 115 toward closed position, thereby throttling the flow of refrigerant gas or vapor to the compressor which will reduce the overload condition. The operation of this valve will be apparent from the foregoing description and the description of the valves of Figs. 2 and 3.

Having thus described the invention, what is claimed and desired to be secured by Letters Patent of the United States is:

1. A thermostatic valve, comprising a tubular supporting member, a temperature responsive power element carried by one end of said supporting member, said element having a cavity and having a hollow extension fitting within said supporting member, temperature responsive material in said cavity, said cavity being alined with the bore of said extension, pressure responsive means sealing said bore, a plunger seating on and movable by said responsive means and guided in said bore, a valve casing carried by the other end of said supporting member and having a valve port, a valve member in said casing for controlling flow through said part, a two-part operating rod alined with and movable by said plunger and extending through said port, said valve member being screw-threadedly secured to one of the parts of said rod, said rod being separable and rigidly screw-threaded together for operation, a guide member carried by the other part of said rod and operable to hold said other rod part against rotation for separation of the rod parts whereby said valve member can be removed, and spring means acting through said rod in opposition to movement of said rod by said responsive material.

2. A thermostatic device, comprising a tubular supporting member, a temperature responsive power element carried by one end of said supporting member, said element having a two-part body enclosing an expansion chamber, a diaphragm within said body and sealing said chamber, one part of said body having a hollow extension secured within one end of said supporting member, the other part of said body having a pipe receiving yoke, a clamping plate removably secured to said yoke, a sealing plug in said extension and engaging and movable by said diaphragm, temperature responsive power generating material within said chamber and operable upon temperature increase to move said diaphragm, a plunger guided in said extension, a control casing carried by the other end of said supporting member, control means in said casing, a two-part operating rod reciprocally guided in said casing and having sections screw-threaded together, said rod having one section operatively secured to said control means and having its other section extending into cooperable relation to said plunger for movement thereby, a flange on said rod other section within said supporting member, means holding said rod other section against rotation so that said rod one section and said control means can be disconnected from said power element, and a spring resisting operation of said control means by said power element and positioned within said supporting member and acting on said flange.

3. A thermostatic valve comprising a valve casing having a tubular extension and having a bore therethrough extending through said extension, said bore having an annular shoulder within said extension and facing the interior of said casing, said casing having alined inlet and outlet openings transverse to said bore and having a screw cap closing the opposite end of said bore from said extension, said bore having an annular shoulder facing said cap and positioned in the plane of said openings, said bore being screw-threaded between said shoulders, a sealing plug seating on said first-named shoulder and screw-threaded in said bore and having a guideway therethrough alined with said bore, a valve seat member screw-threaded in said bore and seating on said second-named shoulder, said casing having passageways connecting one of said openings to said bore on one side of said valve seat member and connecting the other of said openings to said bore on the other side of said valve seat member, a two-part valve stem rigidly screw-threaded together, one stem part extending through the port in said seat member and the other stem part reciprocally fitting said guideway and projecting from said extension, said plug having a longitudinal guide slot opening into said guideway, a guide pin projecting from said other stem part into said guide slot, a valve member on said one stem part and cooperable with said seat member on the opposite side from said other stem part, a tubular supporting member projecting from and having one end secured in said extension, said other stem part having a flange within said extension, a helical spring surrounding said other stem part and being held under compression by and between said plug and said flange, a thermostatic power element having a casing with a cover member having a tubular extension fitting and secured in the other end of said tubular supporting member, a plunger engageable with said stem and reciprocally fitting the bore of said last-named extension, temperature responsive material in said power element casing, a diaphragm in said casing and clamped by said cover member and transmitting movement from said responsive material to said plunger, said casing having a pipe receiving yoke, and a clamping plate cooperable with and closing the open side of said yoke.

4. A thermostatic valve comprising a valve casing having a tubular extension and having a bore therethrough extending through said extension, said bore having an annular shoulder within said extension and facing the interior of said casing, said casing having alined inlet and outlet openings transverse to said bore and having a screw cap closing the opposite end of said bore from said extension, said bore having an annular shoulder facing said cap and positioned in the plane of said openings, said bore being screw-threaded between said shoulders, a sealing plug seating on said first-named shoulder and screw-threaded in said bore and having a guideway therethrough alined with said bore, a valve seat member screw-threaded in said bore and seating on said second - named shoulder, said casing having passageways connecting one of said openings to said bore on one side of said valve seat member and connecting the other of said openings to said bore on the other side of said valve seat member, a two-part valve stem rigidly screw-threaded together, one stem part extending through the port in said seat member and the other stem part reciprocally fitting said guideway and projecting from said extension, said plug having a longitudinal guide slot opening into said guideway, a guide pin projecting from said other stem part into said guide slot, a valve member on said one stem part and cooperable with said seat member on the opposite side from said other stem part, a tubular supporting member projecting from and having one end secured in said extension, said other stem part having a flange within said extension, a helical spring surrounding said other stem part and being held under compression by and between said plug and said flange, and actuating means operable to move said valve stem.

5. A thermostatic valve comprising a tubular supporting member, a temperature responsive power element including a rigid casing having a part fitting within and sealed to one end of said supporting member, said power element casing having a cavity with a rigid cover member having a guideway therethrough opening directly into said cavity and said supporting member, temperature responsive material in said cavity, a diaphragm in said casing and sealing said responsive material from said guideway, a plunger reciprocally fitting said guideway and movable by said diaphragm, a valve casing having a tubular extension slidably receiving and rigidly secured to the other end of said supporting member, said extension having an internal shoulder against which one end of said supporting member seats, a valve member in said valve casing for controlling flow therethrough, a separable two-part operating rod alined with and movable with said plunger and having one part guided in said supporting member and having its other part connected to and operable to move said valve member, spring means acting directly on and through said one rod part in opposition to movement of said rod by said responsive material, said rod parts being screw-threaded together for endwise movement of said other part and valve member relative to said one part and spring means, and means cooperable with said rod to hold positively one of said rod parts against rotary movement during rotation of the other part.

6. A valve as defined in claim 5 wherein said valve member is a butterfly valve and is connected by a pinned connection for operation by said valve stem, and said pinned connection providing the means to hold one of said rod parts against rotary movement during rotation of the other part.

EARNEST J. DILLMAN.

REFERENCES CITED

The following references are of record in the file of this patent:

UNITED STATES PATENTS

| Number | Name | Date |
|---|---|---|
| 1,234,573 | Sandvoss | July 24, 1917 |
| 1,290,249 | Lawler | Jan. 7, 1919 |
| 1,528,788 | Rayfield | Mar. 10, 1925 |
| 1,751,688 | Eggleston | Mar. 25, 1930 |
| 1,884,794 | McKee | Oct. 25, 1932 |
| 1,952,683 | Resek et al. | Mar. 27, 1934 |
| 2,241,324 | Selby | May 6, 1941 |
| 2,277,998 | Thompson | Mar. 31, 1942 |
| 2,368,181 | Vernet | Jan. 30, 1945 |

FOREIGN PATENTS

| Number | Country | Date |
|---|---|---|
| 14,211 | Great Britain | 1904 |
| 633,276 | Germany | July 23, 1936 |